United States Patent [19]

Sundberg

[11] 4,080,234
[45] Mar. 21, 1978

[54] METHODS AND APPARATUS FOR MAKING SHEATHS FOR BATTERY ELECTRODES

[75] Inventor: Erik G. Sundberg, Yardley, Pa.

[73] Assignee: Aktiebolaget Tudor, Sundbyberg, Sweden

[21] Appl. No.: 695,788

[22] Filed: Jun. 14, 1976

[30] Foreign Application Priority Data

Jun. 16, 1975 Sweden .................................. 7506855

[51] Int. Cl.² ...................... B29D 23/00; B32B 31/20
[52] U.S. Cl. ..................................... 156/218; 156/282; 156/311; 156/466; 156/498; 156/499; 156/500
[58] Field of Search ............... 156/185, 186, 187, 189, 156/218, 282, 321, 322, 428, 429, 499, 500, 311, 169, 173, 445, 466, 498; 429/131, 133, 136, 140, 141, 142, 143, 144, 145, 164, 160, 175, 233, 234, 235, 237, 238

[56] References Cited

U.S. PATENT DOCUMENTS

| 2,896,006 | 7/1959 | Sundberg | 429/140 |
| 2,912,043 | 11/1959 | Bargholtz et al. | 156/466 |
| 3,159,515 | 12/1964 | Dunlap et al. | 156/498 |
| 3,350,251 | 10/1967 | Davis | 156/466 |
| 4,008,100 | 2/1977 | Sundberg et al. | 156/184 |

*Primary Examiner*—Caleb Weston
*Attorney, Agent, or Firm*—Burns, Doane, Swecker & Mathis

[57] ABSTRACT

A sheath for battery electrodes is made by introducing a fibrous tubular material along a mandrel. A perforated thermoplastic material is applied around the outside of the fibrous material. Subsequent to applying the fibrous material, the mandrel is heated, thereby heating the fibrous material. The latter heats and softens the inside of the thermoplastic material at their points of mutual contact. The thermoplastic material is then subjected to external pressing forces and external cooling temperatures to press the thermoplastic material against the fibrous material while cooling the thermoplastic material.

3 Claims, 2 Drawing Figures

METHODS AND APPARATUS FOR MAKING SHEATHS FOR BATTERY ELECTRODES

BACKGROUND AND OBJECTS

The present invention relates to the manufacture of sheathing for tubular electrodes for storage batteries.

Sheaths of this nature are known which comprise a fibrous inert material, on the outside of which there is disposed a thermoplastic material in the form of a net, perforated foil or the like. The sheath materials are delivered continuously over a stationary mandrel, during production and are joined together to form a tubular sheath as described for instance in U.S. Pat. Nos. 3,725,130 and 2,912,043.

In copending and commonly assigned U.S. application Ser. No. 533,499 filed Dec. 1, 1974, and Ser. No. 664,997 filed Mar. 8, 1974, methods are described for the manufacture of such a sheath. According to such methods, the fibrous material is heated before the thermoplastic material is delivered. Thus, there is produced, through contact of the materials, at least a local softening or melting of the thermoplastic material, so that a joint can be formed between the two materials. The process of the present invention is suitable both for such a method and for other methods where there is no preheating of the fibrous material.

It is an object of the present invention to provide a novel method for making electrode sheaths.

It is another object of the invention to provide such a method which minimizes deformation of the thermoplastic material.

It is another object of the present invention to provide novel apparatus for forming a tubular electrode sheath.

BRIEF SUMMARY

The method of the present invention is characterized in that the mandrel is heated so that the inside of the thermoplastic material softens or melts and the outside of the thermoplastic material is cooled from the outside and subjected to pressure. In this way there is a significant improvement of the joint between the two materials, with avoidance of deformation of the thermoplastic material.

THE DRAWINGS

The invention will be illustrated in more detail in connection with the figures, where:

FIG. 1 shows apparatus for carrying out the process of the invention, taken generally along line 1—1 of FIG. 2; and FIG. 2 shows a cross section through the cooling apparatus.

DETAILED DESCRIPTION

Figure 1:
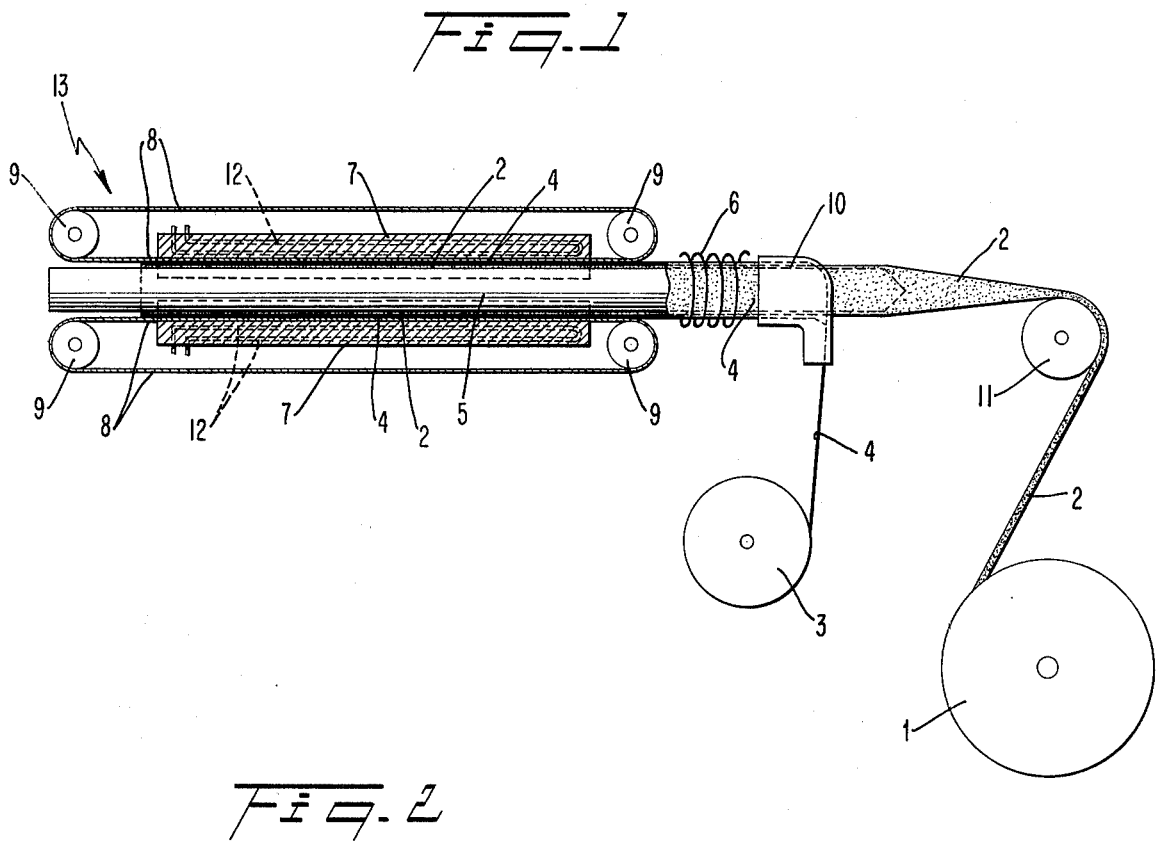
Figure 2:
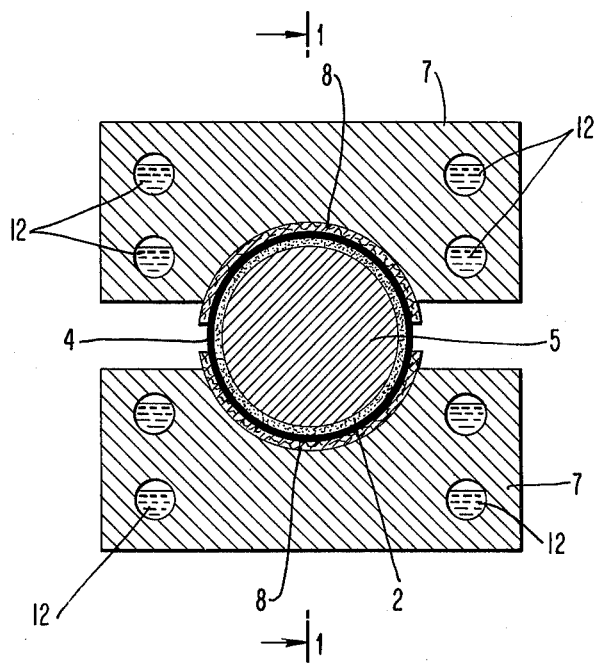

The materials employed in forming a tubular sheath for a battery electrode, viz., a porous thermoplastic material 4 and a porous fibrous material 2 are respectively wound on spools 3, 1 or the like. The materials are delivered to a mandrel 5 which can be formed with a crook and held by means of a drive wheel 11, as is common. Suitably, the fibrous inert material can be in the form of a braided stocking of conventional material such as one containing glass fibers. The thermoplastic material can comprise a perforated sheet or a plastic knit, for example. The apparatus includes a member 10 that causes the thermoplastic material 4 to be wrapped around the fibrous material 2 as the sheath is advanced along the mandrel. Such a member 10 is very well known in the art and need not be further described.

The apparatus and method described up to now is conventional. In accordance with the present invention, the mandrel is heated preferably at a point after the deliverance of both the fibrous material 2 and the thermoplastic material 5, and the sheath is then simultaneously cooled and pressed.

Heating is preferably accomplished by means of a high frequency, inductive heating coil 6 which heats the mandrel by inductive force. Other heating operations are possible, as long as heating occurs from within the sheathing materials, rather than from without. Heating can occur before or after the thermoplastic material is introduced continuously around the fibrous material. Thus, the mandrel is heated and it, in turn, heats the fibrous material 2. At points of mutual contact between the fibrous material 2 and the thermoplastic material, the heated fibrous material causes the thermoplastic material to soften.

Subsequently, the sheathing materials pass through a press-and-cool station wherein they are simultaneously pressed and cooled. At this station, a cooling press 13 is preferably employed which includes a pair of endless conveyor belts 8, each being wrapped around opposite guide rolls 9, of which at least one is driven to rotate the belt. The belts are arranged so that inner flights thereof are disposed on opposite sides of the mandrel and sheathing materials 2, 4.

A pair of blocks or cheeks 7 are located outwardly of the inner conveyor flights and are biased in any suitable fashion toward such conveyor flights to exert pressure on the conveyor belts 8 to urge the inner conveyor flights in pressing engagement against the outer periphery of the thermoplastic material. This causes the thermoplastic material 4 to be pressed against the fibrous material 2 as the materials are conveyed along the mandrel. At the same time, cooling fluid is conducted through channels 12 formed in the cheeks. This coolant serves to cool the conveyor belts 8 which, in turn, cool the thermoplastic material as the latter travels along the mandrel.

It will be realized, then, that after the thermoplastic material has been softened, it is pressed against the fibrous material 2, Therefore, at the softened regions, the thermoplastic material is pressed into the outer fibers of the fibrous material. By the time that the sheathing material exists from the cooling press, the thermoplastic material has been sufficiently cooled and set to establish a bond between it and the fibrous material. Since the configuration of the thermoplastic material has been controlled by the belts 8 during this stage, minimal deformation can occur.

Although the invention has been described in connection with a preferred embodiment thereof, it will be appreciated by those skilled in the art that additions, modifications, substitutions and deletions not specifically described may be made without departing from the spirit and scope of the invention as defined in the appended claims.

What is claimed is:

1. A method for making a sheath for battery electrodes comprising the steps of:

introducing an inert porous, fibrous, tubular material along a mandrel;

applying a porous thermoplastic material continuously around the outside of said fibrous inert material;

subsequent to applying said fibrous material, heating the mandrel to heat said fibrous material so that heat from said fibrous material heats and softens the inside of said thermoplastic material at the locations of contact between the fibrous and thermoplastic material, in the absence of applying heat exteriorly of said thermoplastic material; and thereafter subjecting said thermoplastic material to external pressing forces and external cooling temperatures to press said thermoplastic material against said fibrous material while cooling said thermoplastic material.

2. A method according to claim 1 wherein said heating step comprises inductively heating said mandrel.

3. Apparatus for making a sheath for battery electrodes comprising:

a stationary mandrel;

means for introducing a porous fibrous tubular material onto said mandrel for conveyance therealong;

means for introducing a porous thermoplastic material onto said fibrous material for conveyance therewith;

an inductive heating coil disposed around said mandrel for heating said mandrel to heat said fibrous material so that heat from said fibrous material heats and softens the inside of said thermoplastic material at the regions of contact between said thermoplastic material and fibrous material, in the absence of applying heat exteriorly of said thermoplastic material; and pressing and cooling means located downstream of said heating coil for subjecting said thermoplastic material to external pressing forces and external cooling temperatures to press said thermoplastic material against said fibrous material while cooling said thermoplastic material.

* * * * *